(12) United States Patent
Chandrashekar et al.

(10) Patent No.: US 11,859,718 B1
(45) Date of Patent: Jan. 2, 2024

(54) AXLE ASSEMBLY HAVING A SHIFT COLLAR

(71) Applicant: ArvinMeritor Technology, LLC, Troy, MI (US)

(72) Inventors: Supreeth Chandrashekar, Bangalore (IN); Jeremy Cradit, Troy, MI (US); David M Zueski, Troy, MI (US); Nick Bofferding, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/305,707

(22) Filed: Apr. 24, 2023

(51) Int. Cl.
| | |
|---|---|
| F16H 63/32 | (2006.01) |
| F16H 3/093 | (2006.01) |
| F16H 57/031 | (2012.01) |
| F16H 63/30 | (2006.01) |
| F16H 37/08 | (2006.01) |
| F16H 57/02 | (2012.01) |

(52) U.S. Cl.
CPC ............ *F16H 63/32* (2013.01); *F16H 3/093* (2013.01); *F16H 57/031* (2013.01); *F16H 63/3013* (2013.01); *F16H 37/08* (2013.01); *F16H 2057/02052* (2013.01)

(58) Field of Classification Search
CPC ........ F16H 3/093; F16H 57/031; F16H 37/08; F16H 2057/02052; F16H 63/32; F16H 63/3013
See application file for complete search history.

(56) References Cited

U.S. PATENT DOCUMENTS

| | | |
|---|---|---|
| 1,981,236 A | 11/1934 | Logue |
| 6,176,146 B1 | 1/2001 | Ore |
| 7,798,937 B2 | 9/2010 | Gitt |
| 8,398,520 B1 * | 3/2013 | Bassi ............... B60K 17/36 |
| | | 475/221 |
| 9,719,563 B2 | 8/2017 | Hirao |
| 10,989,288 B1 | 4/2021 | Ghatti et al. |
| 11,168,783 B1 | 11/2021 | Cradit et al. |
| 11,207,976 B2 | 12/2021 | Ghatti et al. |
| 11,209,072 B2 | 12/2021 | Ghatti et al. |
| 11,220,176 B1 | 1/2022 | Cradit et al. |
| 11,441,644 B2 | 9/2022 | Ghatti et al. |
| 11,441,657 B2 | 9/2022 | Chandrashekar et al. |
| 2009/0211830 A1 * | 8/2009 | Kato ............... B60K 23/08 |
| | | 180/244 |
| 2011/0111910 A1 | 5/2011 | Ideshio et al. |
| 2014/0311266 A1 | 10/2014 | Nakashima et al. |
| 2017/0059007 A1 | 3/2017 | Eo et al. |
| 2018/0015816 A1 | 1/2018 | Robinette et al. |
| 2018/0112770 A1 | 4/2018 | Hansson et al. |
| 2019/0054816 A1 | 2/2019 | Garcia et al. |
| 2019/0054817 A1 | 2/2019 | Garcia et al. |
| 2019/0054818 A1 | 2/2019 | Garcia et al. |
| 2020/0173494 A1 | 6/2020 | Smith et al. |
| 2020/0173531 A1 | 6/2020 | Smith |

(Continued)

*Primary Examiner* — Edwin A Young
(74) *Attorney, Agent, or Firm* — Brooks Kushman PC

(57) ABSTRACT

An axle assembly having a collar that receives a shift collar that is moveable along an axis. An alignment rod may be provided to inhibit rotation of the collar about the axis. A linkage retaining device may be provided that is selectively engageable with a linkage that is operatively connected to the shift collar to inhibit rotation of the linkage.

20 Claims, 11 Drawing Sheets

(56) References Cited

U.S. PATENT DOCUMENTS

| | | |
|---|---|---|
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |
| 2021/0156464 A1* | 5/2021 | Ghatti .................... B60K 17/36 |
| 2022/0316590 A1 | 10/2022 | Chandrashekar et al. |

* cited by examiner

AXLE ASSEMBLY HAVING A SHIFT COLLAR

TECHNICAL FIELD

This relates to an axle assembly having a shift collar.

BACKGROUND

An axle assembly having a clutch collar is disclosed in U.S. Pat. No. 9,719,563.

SUMMARY

In at least one embodiment, an axle assembly is provided. The axle assembly includes a drive pinion, a set of drive pinion gears, an alignment rod, a shift collar, and a collar. The drive pinion is rotatable about an axis. The set of drive pinion gears is received in a housing. The set of drive pinion gears is spaced apart from the drive pinion. The drive pinion gears are rotatable about the axis. The alignment rod is disposed on the housing. The shift collar is rotatable about the axis with the drive pinion. The shift collar is movable along the axis with respect to the drive pinion. The collar defines a collar hole that receives the shift collar. The collar has a collar arm that is moveably disposed on the alignment rod. The alignment rod inhibits rotation of the collar about the axis.

The alignment rod may be disposed substantially parallel to the axis. The alignment rod may be disposed below the axis. The alignment rod may be disposed below the shift collar.

The collar arm may have an opening. The alignment rod may be received in the opening.

The housing may include a first transmission housing and a second transmission housing. The first transmission housing and the second transmission housing may cooperate to define a transmission housing cavity. The transmission may be received in the transmission housing cavity. A cover may be disposed on the second transmission housing. The second transmission housing and the cover may cooperate to at least partially define a shift mechanism cavity, The alignment rod may be received in the shift mechanism cavity. The first transmission housing may be mounted to the second transmission housing. The alignment rod may be mounted to the second transmission housing. The alignment rod may be mounted to the cover.

In at least one embodiment an axle assembly is provided. The axle assembly includes a drive pinion, a transmission, and a shift mechanism. The drive pinion is rotatable about an axis. The transmission includes a set of drive pinion gears. The set of drive pinion gears is spaced apart from the drive pinion. The drive pinion gears are rotatable about the axis. The shift mechanism includes a shift collar, an actuator, a detent linkage, a linkage, a collar, and a linkage retained device. The shift collar is rotatable about the axis with the drive pinion. The collar is movable along the axis with respect to the drive pinion. The actuator is configured to move the shift collar along the axis to selectively connect a member of the set of drive pinion gears to the drive pinion. The detent linkage is coupled to the actuator. The detent linkage is rotatable about an actuator axis. The linkage is rotatably disposed on the detent linkage. The linkage is rotatable about the actuator axis. The collar is coupled to the linkage. Collar defines a collar hole. Collar hole receives the shift collar. The linkage retained device is selectively engageable with the linkage to inhibit rotation of the linkage in at least one direction about the axis.

The linkage retaining device may have an engagement feature. The engagement feature may be movable along a linkage retaining device axis. The linkage retaining device axis may be disposed substantially parallel to the axis. The linkage retaining device may be offset from the axis. The linkage retaining device axis may be disposed substantially perpendicular to the actuator axis.

The linkage may have a set of teeth. The engagement feature may be engageable with at least one member of the set of teeth to inhibit rotation of the linkage about the actuator axis.

The detent linkage may be rotatable about the actuator axis with respect to the linkage when the engagement feature is engaged with at least one member of the set of teeth.

The engagement feature may engage a first member of the set of teeth when the linkage is in a first position. The engagement feature may inhibit movement of the shift collar in a first direction along the axis.

The engagement feature may be positioned between a first member of the set of teeth and a second member of the set of teeth when the linkage is in a second position. The engagement feature may engage the first member of the set of teeth to inhibit movement of the shift collar in a second direction along the axis. The second direction may be disposed opposite the first direction. The engagement feature engages the second member of the set of teeth to inhibit movement of the shift collar in the first direction along the axis.

The first member of the set of teeth may be aligned with the engagement feature when the shift collar is in a first neutral position.

The second member of the set of teeth may be aligned with the engagement feature when the shift collar is in a second neutral position.

The engagement feature may engage the second member of the set of teeth when the linkage is in a third position. The engagement feature may inhibit movement of the shift collar in a second direction along the axis.

The detent linkage may have a set of recesses. A detent feature a be receivable in a member of the set of recesses to resist rotation of the detent linkage.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

WA The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises." and/or "comprising." when used in this specification, specify the presence of stated features, integers, steps, operations, elements, and/or components, but do not preclude the presence or addition of one or more other features, integers, steps, operations, elements, components, and/or groups thereof.

Figure 1:
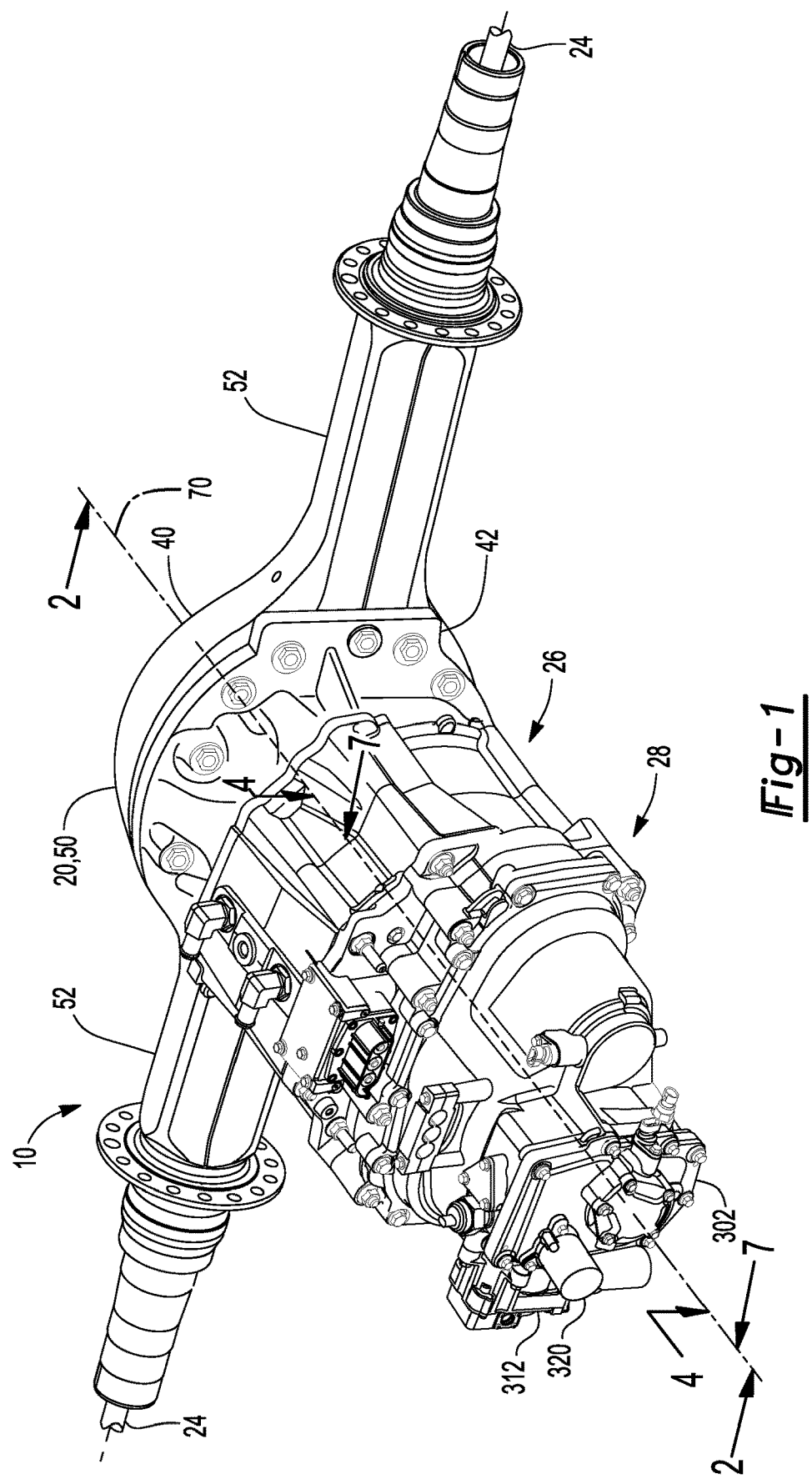
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 is configured to provide torque to one or more traction wheel assemblies that may include a tire mounted on a wheel. The wheel may be mounted to a wheel hub that may be rotatable about a wheel axis.

Figure 2:
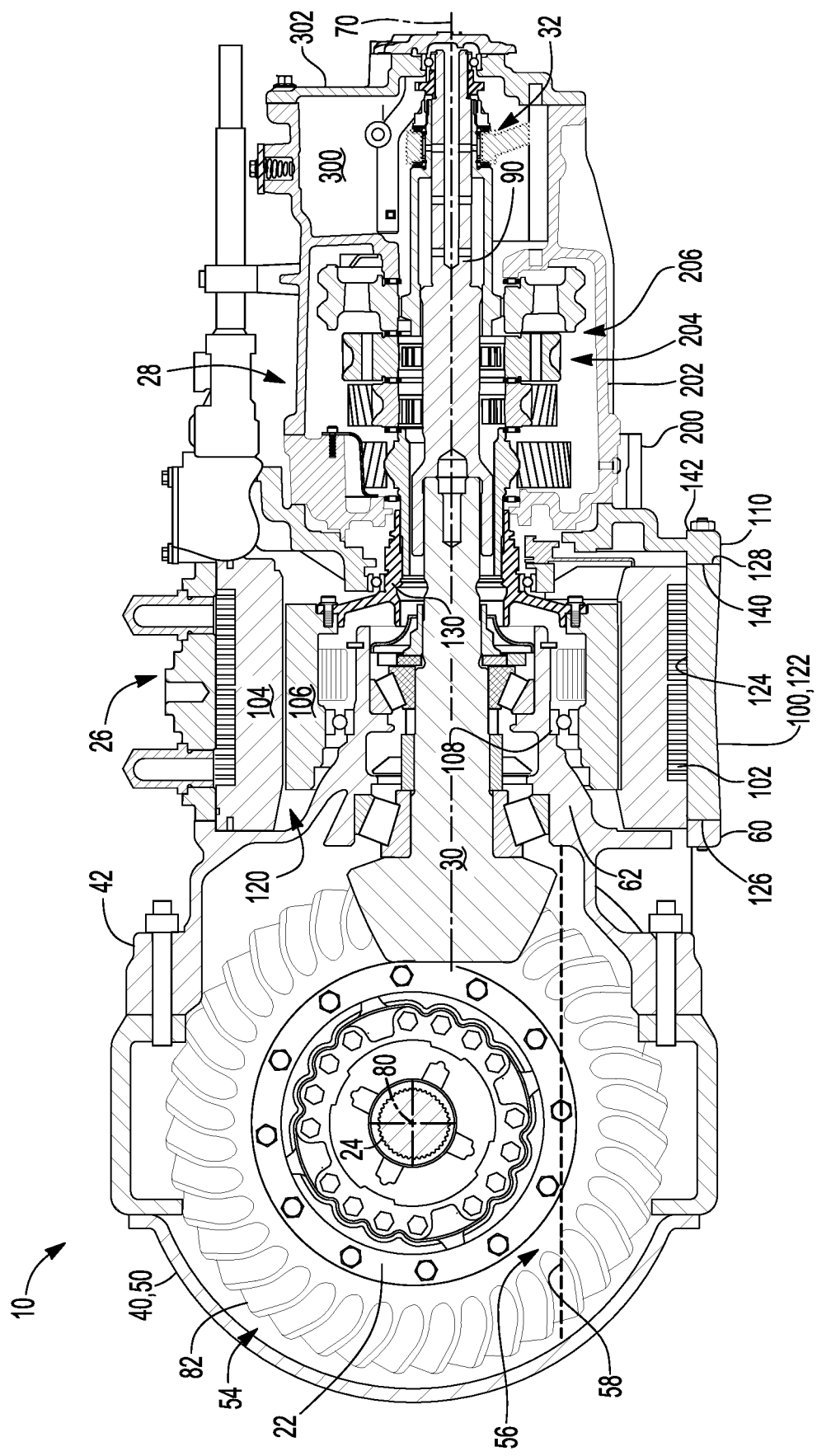
FIG. 2 is a section view of the axle assembly along section line 2-2.

One or more axle assemblies may be provided with the vehicle. A single axle assembly is shown in FIGS. 1 and 2. The axle assembly 10 may include a housing assembly 20, a differential assembly 22, at least one axle shaft 24, an electric motor module 26, and a transmission module 28, a drive pinion 30, a shift mechanism 32, or combinations thereof.

Housing Assembly

Referring to FIG. 1, the housing assembly 20 receives various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. As is best shown in FIG. 2, the center portion 50 may define a cavity 54 that may at least partially receive the differential assembly 22. A lower region of the center portion 50 may at least partially define a sump portion 56 that may contain or collect lubricant 58. Lubricant 58 in the sump portion 56 may be splashed by a ring gear 82 of the differential assembly 22 and distributed to lubricate various components that may or may not be received in the housing assembly 20. For instance, some splashed lubricant 58 may lubricate components that are received in the cavity 54 like the differential assembly 22, bearing assemblies that rotatably support the differential assembly 22, a drive pinion 30, and so on, while some splashed lubricant 58 may be routed out of the cavity 54 to lubricate components located outside of the housing assembly 20, such as components associated with the transmission module 28, the shift mechanism 32, or both.

Referring to FIG. 1, one or more arm portions 52 may extend from the center portion 50. For instance, two arm portions 52 may extend in opposite directions from the center portion 50 and away from the differential assembly 22. The arm portions 52 may have similar configurations. For example, the arm portions 52 may each have a hollow tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring primarily to FIG. 2, the differential carrier 42 is configured to support the differential assembly 22. For example, the differential carrier 42 may include one or more bearing supports that may support a bearing like a roller bearing assembly that may rotatably support the differential assembly 22. The differential carrier 42 may be mounted to the center portion 50 of the axle housing 40. The differential carrier 42 may also facilitate mounting of the electric motor module 26. In at least one configuration, the differential carrier 42 may include a mounting flange 60 and/or a bearing support wall 62.

The mounting flange 60 may facilitate mounting of the electric motor module 26. As an example, the mounting flange 60 may be configured as a ring that may extend around an axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support a bearing that may rotatably support the drive pinion 30, a bearing that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 30 and the bearings that rotatably support the drive pinion 30. The bearing support wall 62 may be integrally formed with the differential carrier 42 or may be a separate component that is fastened to the differential carrier 42.

Differential Assembly, Drive Pinion, and Axle Shafts

Referring to FIG. 2, the differential assembly 22 is about a differential axis 80 and is configured to transmit torque to the axle shafts 24 and wheels. The differential assembly 22 is operatively connected to the axle shafts 24 and may permit the axle shafts 24 to rotate at different rotational speeds in a manner known by those skilled in the art. The differential assembly 22 may be at least partially received in the center portion 50 of the housing assembly 20. The differential assembly 22 may have a ring gear 82 that may have teeth that mate or mesh with the teeth of a gear portion of the drive pinion 30. Accordingly, the differential assembly 22 may receive torque from the drive pinion 30 via the ring gear 82 and transmit torque to the axle shafts 24.

The drive pinion 30 may operatively connect the transmission module 28 to the differential assembly 22. As such, the drive pinion 30 may transmit torque between the differential assembly 22 and the transmission module 28. In at least one configuration, the drive pinion 30 may be rotatable about the axis 70 and may be rotatably supported inside another component, such as the bearing support wall 62.

Figure 6:
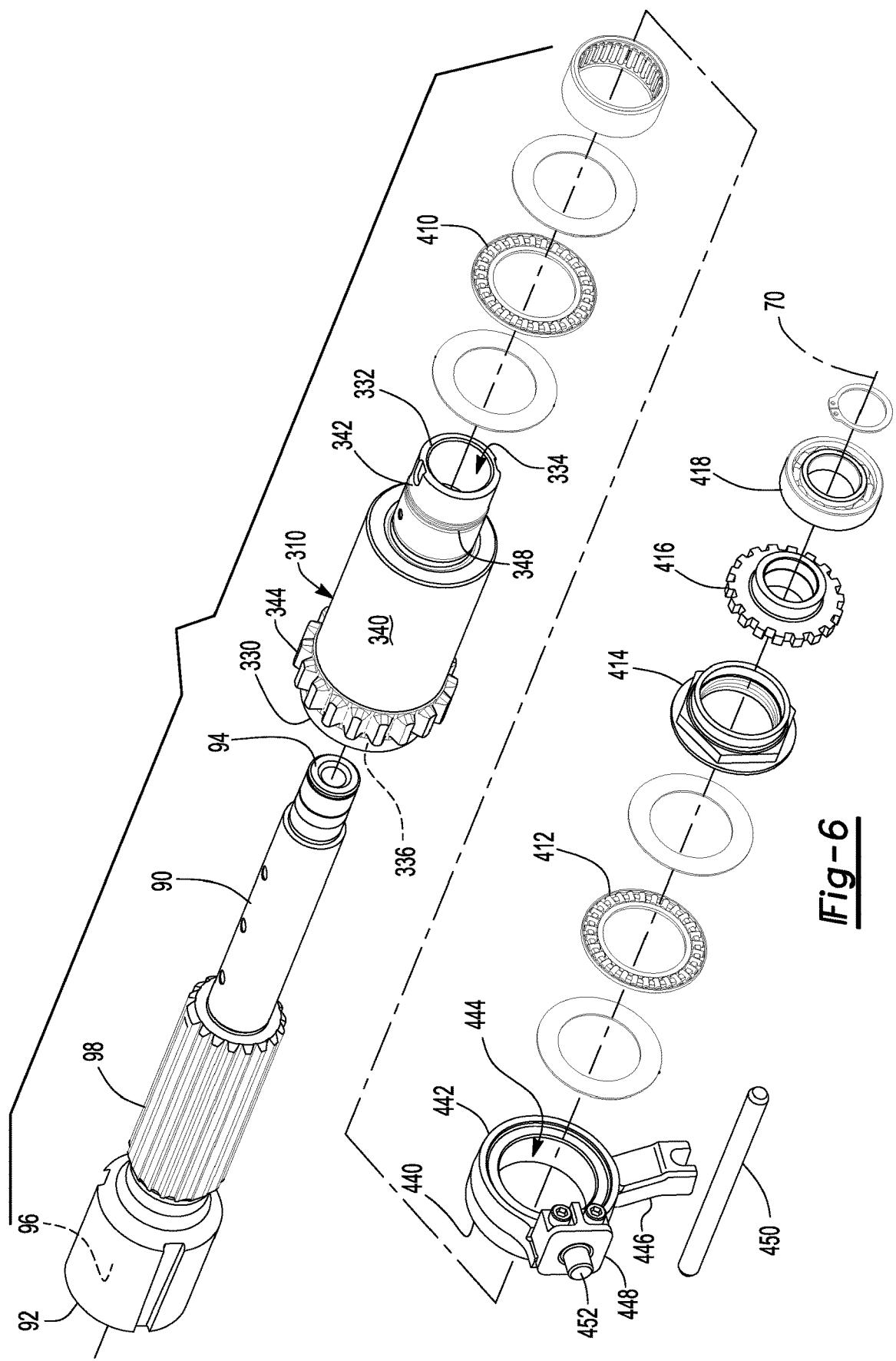
FIG. 6 is an exploded view of a portion of the shift mechanism shown in FIG. 5.

Referring primarily to FIGS. 2 and 6, the drive pinion 30 may optionally include or may be coupled to a drive pinion extension 90. The drive pinion extension 90 may effectively increase the axial length of the drive pinion 30. In at least one configuration, the drive pinion extension 90 may be a separate component from the drive pinion 30 and may be coupled to the drive pinion 30 such that the drive pinion extension 90 is rotatable about the axis 70 with the drive pinion 30. In addition, the drive pinion extension 90 may be fixedly positioned with respect to the drive pinion 30 such that the drive pinion extension 90 may not move along the axis 70 with respect to the drive pinion 30. It is also contemplated that the drive pinion extension 90 may be integrally formed with the drive pinion 30. For convenience in reference, the term "drive pinion 30" is used herein to refer to the drive pinion 30 with or without the drive pinion extension 90.

In at least one configuration, the drive pinion extension 90 may extend from a first end 92 to a second end 94 and may include a socket 96 and the spline 98. The socket 96 may extend from the first end 92 and may receive the drive pinion 30. The second end 94 may be received inside and may be rotatably supported by a support bearing 418. The spline 98, if provided, may facilitate coupling of the drive pinion extension 90 to a shift collar 310 that may be moveable along the axis 70 as will be discussed in more detail below.

Referring to FIG. 1, the axle shafts 24 are configured to transmit torque between the differential assembly 22 and corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, is configured to provide propulsion torque. The electric motor module 26 may be mounted to the differential carrier 42 and may be operatively connectable to the differential assembly 22. For instance, the electric motor module 26 may configured to provide torque to the differential assembly 22 via the transmission module 28 and the drive pinion 30 as will be discussed in more detail below. The electric motor module 26 may be primarily or completely disposed outside the differential carrier 42. In addition, the electric motor module 26 may be axially positioned between the axle housing 40 and the transmission module 28. In at least one configuration, the electric motor module 26 may include a motor housing 100, a coolant jacket 102, a stator 104, a rotor 106, and at least one rotor bearing assembly 108. The electric motor module 26 may also include a motor cover 110.

The motor housing 100 may extend between the differential carrier 42 and the motor cover 110. The motor housing 100 may be mounted to the differential carrier 42 and the motor cover 110. For example, the motor housing 100 may extend from the mounting flange 60 of the differential carrier 42 to the motor cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, and a second end surface 128.

The exterior side 122 faces away from the axis 70 and may define an exterior or outside surface of the motor housing 100.

The interior side 124 is disposed opposite the exterior side 122 and may face toward the axis 70. The interior side 124 may be disposed at a substantially constant radial distance from the axis 70 in one or more configurations.

The first end surface 126 is disposed at an end of the motor housing 100 that may face toward the differential carrier 42. For instance, the first end surface 126 may be disposed adjacent to the mounting flange 60 of the differential carrier 42 and may engage or contact the mounting flange 60. The first end surface 126 may extend between the exterior side 122 and the interior side 124.

The second end surface 128 may be disposed opposite the first end surface 126. As such, the second end surface 128 may be disposed at an end of the motor housing 100 that may face toward the motor cover 110 and may engage or contact the motor cover 110.

The coolant jacket 102 facilitates cooling or heat removal, such cooling of the stator 104. The coolant jacket 102 may be received in the motor housing cavity 120 of the motor housing 100 and may engage the interior side 124 of the motor housing 100. The coolant jacket 102 may extend axially (e.g., in a direction along the axis 70) between the differential carrier 42 and the motor cover 110. For example, the coolant jacket 102 may extend axially from the differential carrier 42 to the motor cover 110. In addition, the coolant jacket 102 may extend around the axis 70 and around the stator 104. Accordingly, the stator 104 may be at least partially received in and may be encircled by the coolant jacket 102. The coolant jacket 102 may extend in a radial direction from the stator 104 to the interior side 124 of the motor housing 100. In at least one configuration, the coolant jacket 102 may include a plurality of channels through which coolant may flow.

The stator 104 is received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 extends around and is rotatable about an axis, such as axis 70. In addition, the rotor 106 may extend around and may be supported by the bearing support wall 62. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104.

One or more rotor bearing assemblies 108 rotatably support the rotor 106. For example, a rotor bearing assembly 108 may extend around and receive the bearing support wall 62 of the differential carrier 42 and may be received inside of the rotor 106. The rotor 106 may be operatively connected to the drive pinion 30. For instance, a coupling such as a rotor output flange 130 may operatively connect the rotor 106 to the transmission module 28, which in turn may be operatively connectable to the drive pinion 30.

The motor cover 110 may be mounted to the motor housing 100 and may be disposed opposite the axle housing 40 and the differential carrier 42. For example, the motor cover 110 may be mounted to the second end surface 128 of the motor housing 100. The motor cover 110 may be spaced apart from and may not engage the differential carrier 42. The motor cover 110 may be provided in various configurations. In at least one configuration, the motor cover 110 may include a first side 140 and a second side 142. The first side 140 may face toward and may engage the motor housing 100. The second side 142 may be disposed opposite the first side 140. The second side 142 may face away from the motor housing 100. The motor cover 110 may also include a motor cover opening through which the drive pinion 30 may extend. The motor cover 110 may be integrated with the transmission module 28 or may be a separate component.

Transmission Module

Figure 4:
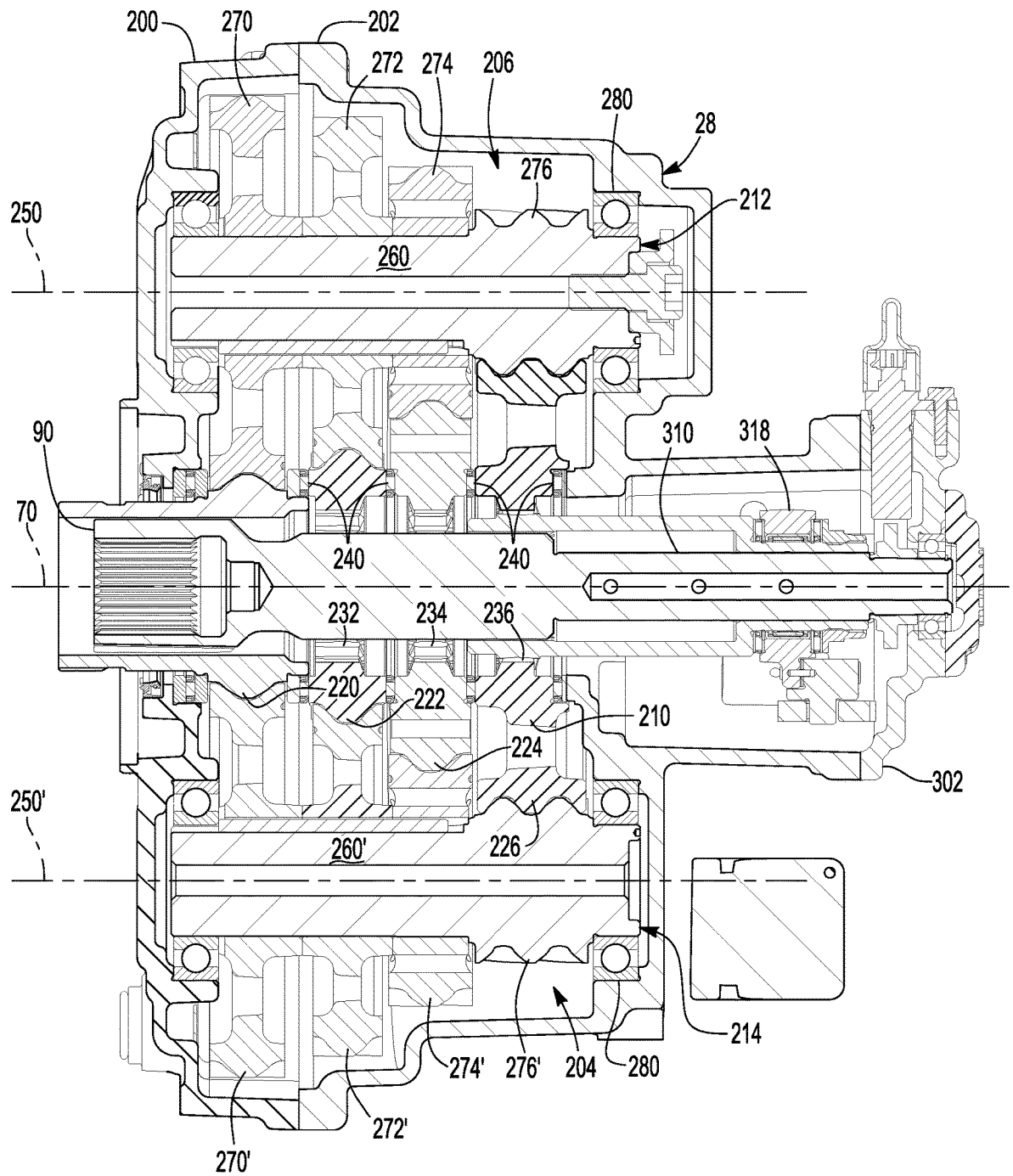
FIG. 4 is a section view of a portion of the axle assembly along section line 4-4 with the electric motor module and drive pinion omitted for clarity.

Referring to FIGS. 2 and 4, the transmission module 28 is configured to transmit torque between the electric motor module 26 and the differential assembly 22. As such, the transmission module 28 may be operatively connectable to the electric motor module 26 and the differential assembly 22. In at least one configuration, the transmission module 28 may include a transmission housing. The transmission housing may include one or more individual housings, such as a first transmission housing 200, a second transmission housing 202. The transmission module 28 may also include a transmission 204. The first transmission housing 200 and the second transmission housing 202 may cooperate to define a transmission housing cavity 206 that may receive the transmission 204.

The first transmission housing 200 may be mounted to the electric motor module 26. For instance, the first transmission housing 200 may be mounted to the second side 142 of the motor cover 110. As such, the motor cover 110 may separate the first transmission housing 200 from the motor housing 100.

The second transmission housing 202 may be mounted to the first transmission housing 200. For instance, the second transmission housing 202 may be mounted to and may engage or contact a side of the first transmission housing 200 that may face away from the motor cover 110. As such, the first transmission housing 200 may separate the second transmission housing 202 from the motor cover 110.

The transmission 204 may be operatively connected to the electric motor. In at least one configuration, the transmission 204 may be configured as a countershaft transmission that includes a set of drive pinion gears 210, a first countershaft gear set 212, and optionally a second countershaft gear set 214.

The set of drive pinion gears 210 is received in the transmission housing cavity 206 of the transmission housing and may be arranged along the axis 70 between the first transmission housing 200 and the second transmission housing 202. The set of drive pinion gears 210 may include a plurality of gears, some or all of which may be selectively coupled to the drive pinion 30. The set of drive pinion gears 210 is spaced apart from the drive pinion 30 and is rotatable about the axis 70. The gears may be independently rotatable with respect to each other. In the configuration shown, the set of drive pinion gears 210 includes a first gear 220, a second gear 222, a third gear 224, and a fourth gear 226; however, it is to be understood that a greater or lesser number of gears may be provided.

The first gear 220 extends around the axis 70 and may be disposed proximate the first transmission housing 200. In at least one configuration, the first gear 220 may have a through hole that may receive the drive pinion 30, an extension of the drive pinion 30 like the drive pinion extension 90, or both. The first gear 220 may have a plurality of teeth that may be arranged around and may extend away from the axis 70. The teeth of the first gear 220 may contact and may mate or mesh with teeth of a first countershaft gear that may be provided with the first countershaft gear set 212 and the second countershaft gear set 214 as will be discussed in more detail below. The first gear 220 may be operatively connected to the rotor 106 of the electric motor module 26 such that the rotor 106 and the first gear 220 are rotatable together about the axis 70. For example, the first gear 220 may be fixedly positioned with respect to the rotor 106 or fixedly coupled to the rotor 106 such that the first gear 220 is not rotatable about the axis 70 with respect to the rotor 106. It is contemplated that the first gear 220 may be fixedly mounted to or integrally formed with the rotor output flange 130. As such, the first gear 220 may be continuously connected to the rotor 106 such that the first gear 220 and the rotor 106 may be rotatable together about the axis 70 but may not be rotatable with respect to each other. It is also contemplated that the first gear 220 may be selectively coupled to the drive pinion 30 or drive pinion extension 90, such as with a shift collar. In addition, the first gear 220 may be decoupled from the drive pinion 30 and may be rotatable with respect to the drive pinion 30. As such, a clutch or shift collar 310 may not connect the first gear 220 to the drive pinion 30 or the drive pinion extension 90. The drive pinion extension 90, if provided, may be received inside the first gear 220 and may be spaced apart from the first gear 220. In at least one configuration, the first gear 220 may be axially positioned along the axis 70 between the second gear 222 and the electric motor module 26.

Figure 7:
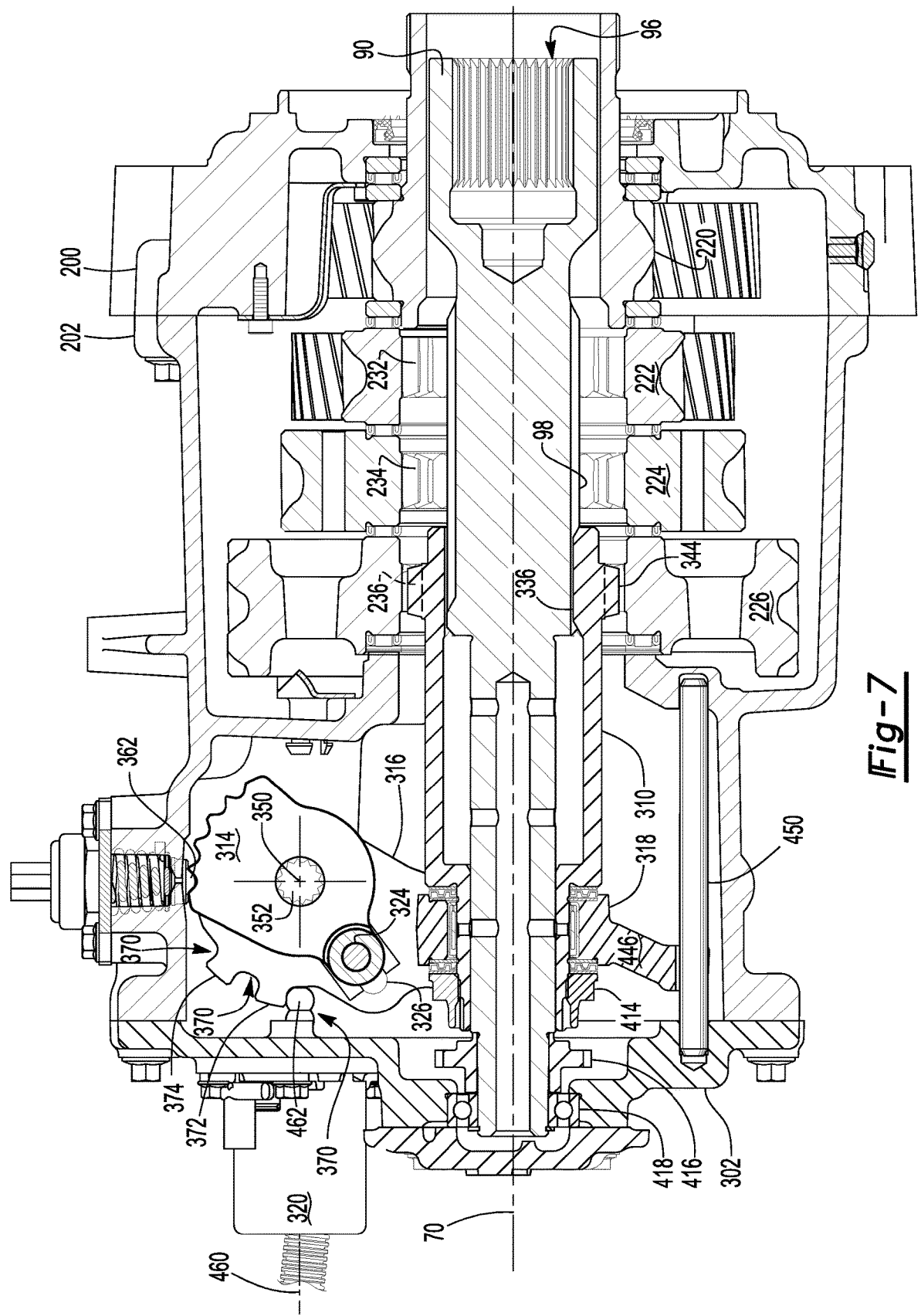
FIG. 7 is a section view of a portion of the axle assembly along section line 7-7 with the electric motor module and drive pinion omitted for clarity and with the shift collar in a first position.

The second gear 222 extends around the axis 70. In at least one configuration, the second gear 222 may have a through hole that may receive the drive pinion 30, the drive pinion extension 90, or both. The second gear 222 may have a plurality of teeth that may be arranged around and may extend away from the axis 70. The teeth of the second gear 222 may contact and may mate or mesh with teeth of a second countershaft gear that may be provided with the first countershaft gear set 212 and the second countershaft gear set 214 as will be discussed in more detail below. As is best shown in FIG. 7, the second gear 222 may also have inner gear teeth 232 that may extend toward the axis 70 and may be received in the through hole. The second gear 222 may have a different diameter than the first gear 220. For example, the second gear 222 may have a larger diameter than the first gear 220. In at least one configuration, the second gear 222 may be axially positioned along the axis 70 between the first gear 220 and the third gear 224. The drive pinion 30 or drive pinion extension 90, if provided, may be received inside the second gear 222 and may be spaced apart from the second gear 222 in one or more configurations.

The third gear 224 extends around the axis 70. In at least one configuration, the third gear 224 may have a through hole that may receive the drive pinion 30, the drive pinion extension 90, or both. The third gear 224 may have a plurality of teeth that may be arranged around and may extend away from the axis 70. The teeth of the third gear 224 may contact and may mate or mesh with teeth of a third countershaft gear that may be provided with the first countershaft gear set 212 and the second countershaft gear set 214 as will be discussed in more detail below. As is best shown in FIG. 7, the third gear 224 may also have inner gear teeth 234 that may extend toward the axis 70 and may be received in the through hole. The third gear 224 may have a different diameter than the first gear 220 and the second gear 222. For example, the third gear 224 may have a larger diameter than the first gear 220 and the second gear 222. In at least one configuration, the third gear 224 be axially positioned along the axis 70 between the second gear 222 and the fourth gear 226. The drive pinion 30 or drive pinion extension 90, if provided, may be received inside the third gear 224 and may be spaced apart from the third gear 224 in one or more configurations.

The fourth gear 226 extends around the axis 70. In at least one configuration, the fourth gear 226 may have a through hole that may receive the drive pinion 30, the drive pinion extension 90, or both. The fourth gear 226 may have a plurality of teeth that may be arranged around and may extend away from the axis 70. The teeth of the fourth gear 226 may contact and may mate or mesh with teeth of a fourth countershaft gear that may be provided with the first countershaft gear set 212 and the second countershaft gear set 214 as will be discussed in more detail below. As is best shown in FIG. 7, the fourth gear 226 may also have inner gear teeth 236 that may extend toward the axis 70 and may be received in the through hole. The fourth gear 226 may have a different diameter than the first gear 220, the second gear 222, and the third gear 224, such as a larger diameter. In at least one configuration, the fourth gear 226 be axially positioned along the axis 70 further from the electric motor module 26 than the first gear 220, the second gear 222, and the third gear 224. As such, the fourth gear 226 may be axially positioned proximate or adjacent to a side of the second transmission housing 202 that is disposed opposite the first transmission housing 200. The drive pinion 30 or drive pinion extension 90 may be received inside the fourth gear 226 and may be spaced apart from the fourth gear 226 in one or more configurations.

Referring to FIG. 4, thrust bearings 240 may optionally be provided between members of the set of drive pinion gears 210, between the first transmission housing 200 and the set of drive pinion gears 210, between the second transmission housing 202 and the set of drive pinion gears 210, or combinations thereof.

The first countershaft gear set 212 is received in the transmission housing cavity 206 and may be in meshing engagement with the set of drive pinion gears 210. The first countershaft gear set 212 may be rotatable about a first countershaft axis 250. The first countershaft axis 250 may be disposed parallel or substantially parallel to the axis 70 in one or more embodiments. The term "substantially parallel" as used herein means the same as or very close to parallel and includes features or axes that are within ±3° of being parallel each other. The first countershaft gear set 212 may include a first countershaft 260 and a plurality of gears. In the configuration shown, the plurality of gears of the first countershaft gear set 212 include a first countershaft gear 270, a second countershaft gear 272, a third countershaft gear 274, and a fourth countershaft gear 276; however, it is contemplated that a greater number of countershaft gears or a lesser number of countershaft gears may be provided.

The first countershaft 260 is rotatable about the first countershaft axis 250. For instance, the first countershaft 260 may be rotatably supported on the first transmission housing 200 and the second transmission housing 202 by corresponding bearing assemblies 280. For example, first and second bearing assemblies 280 may be located near opposing first and second ends the first countershaft 260, respectively. The first countershaft 260 may support and be rotatable with the first countershaft gear 270, the second countershaft gear 272, the third countershaft gear 274, and the fourth countershaft gear 276.

The first countershaft gear 270 is fixedly disposed on the first countershaft 260 or fixedly mounted to the first countershaft 260. As such, the first countershaft gear 270 may rotate about the first countershaft axis 250 with the first countershaft 260 and may not be rotatable with respect to the first countershaft 260. For example, the first countershaft gear 270 may have a hole that may receive the first countershaft 260 and may be fixedly coupled to the first countershaft 260. The first countershaft gear 270 may extend around the first countershaft axis 250 and may have a plurality of teeth that may be arranged around and may extend away from the first countershaft axis 250. The teeth of the first countershaft gear 270 may contact and may mate or mesh with the teeth of the first gear 220. In at least one configuration, the first countershaft gear 270 may be axially positioned along the first countershaft axis 250 between the first transmission housing 200 and the second countershaft gear 272 of the first countershaft gear set 212.

The second countershaft gear 272 is fixedly disposed on the first countershaft 260 or fixedly mounted to the first countershaft 260. As such, the second countershaft gear 272 may rotate about the first countershaft axis 250 with the first countershaft 260 and may not be rotatable with respect to the first countershaft 260. For example, the second countershaft gear 272 may have a hole that may receive the first countershaft 260 and may be fixedly coupled to the first countershaft 260. The second countershaft gear 272 may extend around the first countershaft axis 250 and may have a plurality of teeth that may be arranged around and may extend away from the first countershaft axis 250. The teeth of the second countershaft gear 272 may contact and may mate or mesh with the teeth of the second gear 222. The second countershaft gear 272 may have a different diameter than the first countershaft gear 270 and the third countershaft gear 274. In at least one configuration, the second countershaft gear 272 may be axially positioned along the first countershaft axis 250 between the first countershaft gear 270 of the first countershaft gear set 212 and the third countershaft gear 274 of the first countershaft gear set 212.

The third countershaft gear 274 is fixedly disposed on the first countershaft 260 or fixedly mounted to the first countershaft 260. As such, the third countershaft gear 274 may rotate about the first countershaft axis 250 with the first countershaft 260 and may not be rotatable with respect to the first countershaft 260. For example, the third countershaft gear 274 may have a hole that may receive the first countershaft 260 and may be fixedly coupled to the first countershaft 260. The third countershaft gear 274 may extend around the first countershaft axis 250 and may have a plurality of teeth that may be arranged around and may extend away from the first countershaft axis 250. The teeth of the third countershaft gear 274 may contact and may mate or mesh with the teeth of the third gear 224. The third countershaft gear 274 may have a different diameter than the first countershaft gear 270 and the second countershaft gear 272. In at least one configuration, the third countershaft gear 274 may be axially positioned along the first countershaft axis 250 between the second countershaft gear 272 of the first countershaft gear set 212 and the fourth countershaft gear 276 of the first countershaft gear set 212.

The fourth countershaft gear 276 is fixedly disposed on the first countershaft 260 or fixedly mounted to the first countershaft 260. As such, the fourth countershaft gear 276 may rotate about the first countershaft axis 250 with the first countershaft 260 and may not be rotatable with respect to the first countershaft 260. For example, the fourth countershaft gear 276 may have a hole that may receive the first countershaft 260 and may be fixedly coupled to the first countershaft 260 or may be integrally formed with the first countershaft 260. The fourth countershaft gear 276 may extend around the first countershaft axis 250 and may have a plurality of teeth that may be arranged around and may extend away from the first countershaft axis 250. The teeth of the fourth countershaft gear 276 may contact and may mate or mesh with the teeth of the fourth gear 226. The fourth countershaft gear 276 may have a different diameter than the first countershaft gear 270, the second countershaft gear 272, and the third countershaft gear 274. In at least one configuration, the fourth countershaft gear 276 may be axially positioned along the first countershaft axis 250 further from the electric motor module 26 than the third countershaft gear 274 of the first countershaft gear set 212.

The second countershaft gear set 214, if provided, is received in the transmission housing cavity 206 and may be rotatable about a second countershaft axis 250'. The second countershaft axis 250' may be disposed parallel or substantially parallel to the axis 70 and the first countershaft axis 250 in one or more embodiments. The second countershaft gear set 214 may generally be disposed on an opposite side of the axis 70 from the first countershaft gear set 212 or may be disposed such that the first countershaft axis 250 and the second countershaft axis 250' may be disposed at a common radial distance from the axis 70. The first and second countershaft gear sets 212, 214 may be positioned at any suitable rotational angle or position about the axis 70.

The second countershaft gear set 214 may have the same or substantially the same configuration as the first countershaft gear set 212. For example, the second countershaft gear set 214 may include a second countershaft 260' that may be analogous to or may have the same structure as the first countershaft 260. In addition, the second countershaft gear set 214 may include a plurality of gears that are rotatable with the second countershaft 260'. In the configuration shown, the plurality of gears of the second countershaft gear set 214 include a first countershaft gear 270', a second countershaft gear 272', a third countershaft gear 274', and a fourth countershaft gear 276'; however, it is contemplated that a greater number of gears or a lesser number of gears may be provided. The first countershaft gear 270', second countershaft gear 272', third countershaft gear 274', and the fourth countershaft gear 276' of the second countershaft gear set 214 may be analogous to or may have the same structure as the first countershaft gear 270, second countershaft gear 272, third countershaft gear 274, and the fourth countershaft gear 276, respectively, of the first countershaft gear set 212. The first countershaft gear 270', second countershaft gear 272', third countershaft gear 274', and the fourth countershaft gear 276' may be arranged along and may be rotatable about a second countershaft axis 250' rather than the first countershaft axis 250 and may be fixed to the second countershaft 260' rather than the first countershaft 260.

The first gear 220 and the first countershaft gears 270, 270' may provide a different gear ratio than the second gear 222 and the second countershaft gears 272, 272', the third gear 224 and the third countershaft gears 274, 274', and the fourth gear 226 and the fourth countershaft gears 276, 276'. Gear ratios may be provided that are greater than 1:1, less than 1:1, equal (i.e., 1:1), or combinations thereof.

The teeth of the drive pinion gears and the countershaft gears may be of any suitable type. As a non-limiting example, the meshing teeth of the members of the set of drive pinion gears 210, the gears of the first countershaft gear set 212, and the gears of the second countershaft gear set 214 may have a helical configuration.

Shift Mechanism

Figure 5:
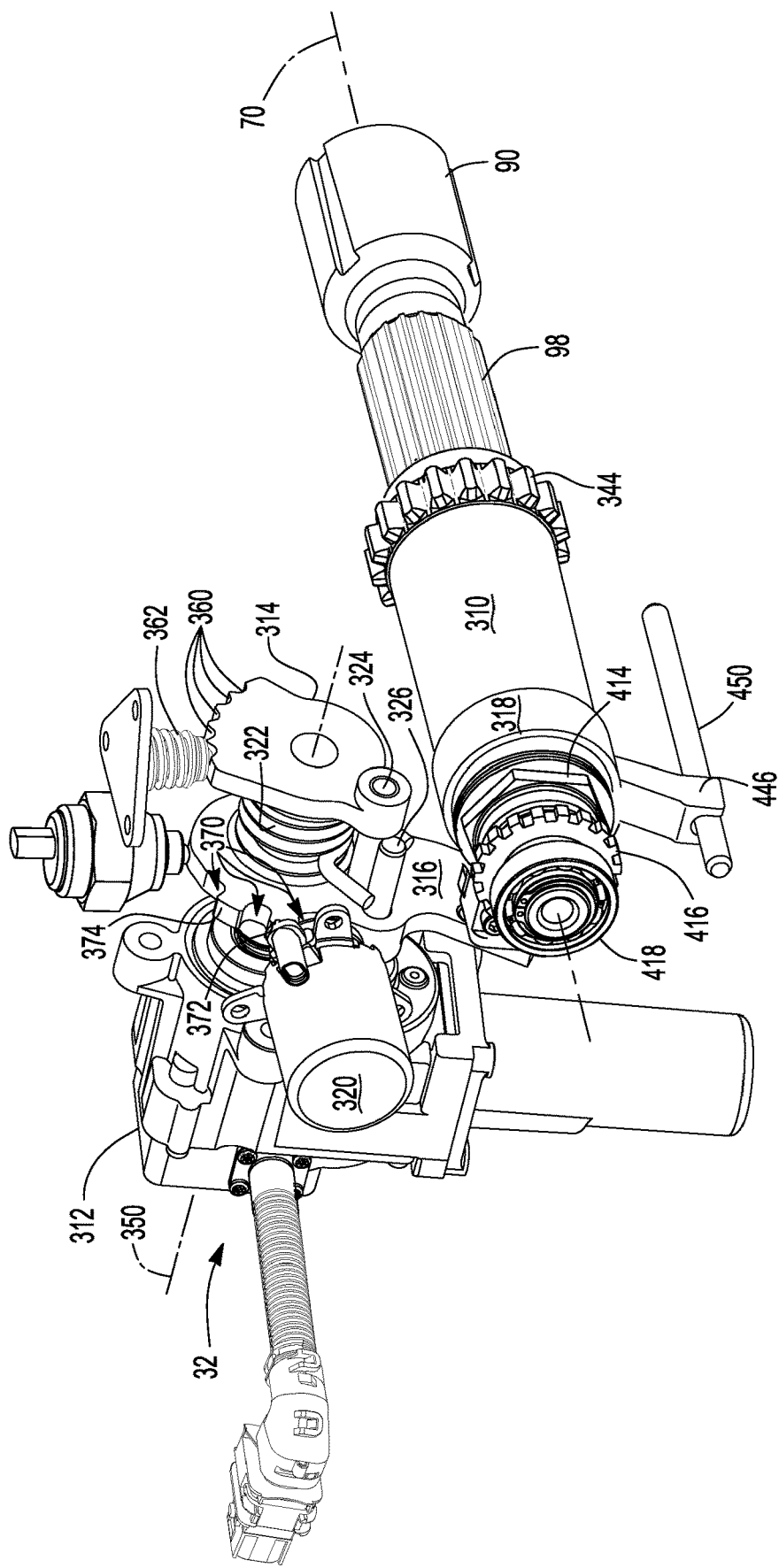
FIG. 5 is a perspective view that includes an example of a shift mechanism having a shift collar that may be provided with the axle assembly.

Referring primarily to FIGS. 2, 5 and 6, the shift mechanism 32 is configured to selectively connect a member of the set of drive pinion gears 210 to the drive pinion 30. For example, the shift mechanism 32 may operatively connect a member of the set of drive pinion gears 210 to the drive pinion 30 to provide torque at a desired gear ratio, and hence may change the torque transmitted between the electric motor module 26 and the differential assembly 22. The shift mechanism 32 may couple one member of the set of drive pinion gears 210 at a time to the drive pinion 30. The member of the set of drive pinion gears 210 that is coupled to the drive pinion 30 may be rotatable about the axis 70 with the drive pinion 30.

Figure 3:
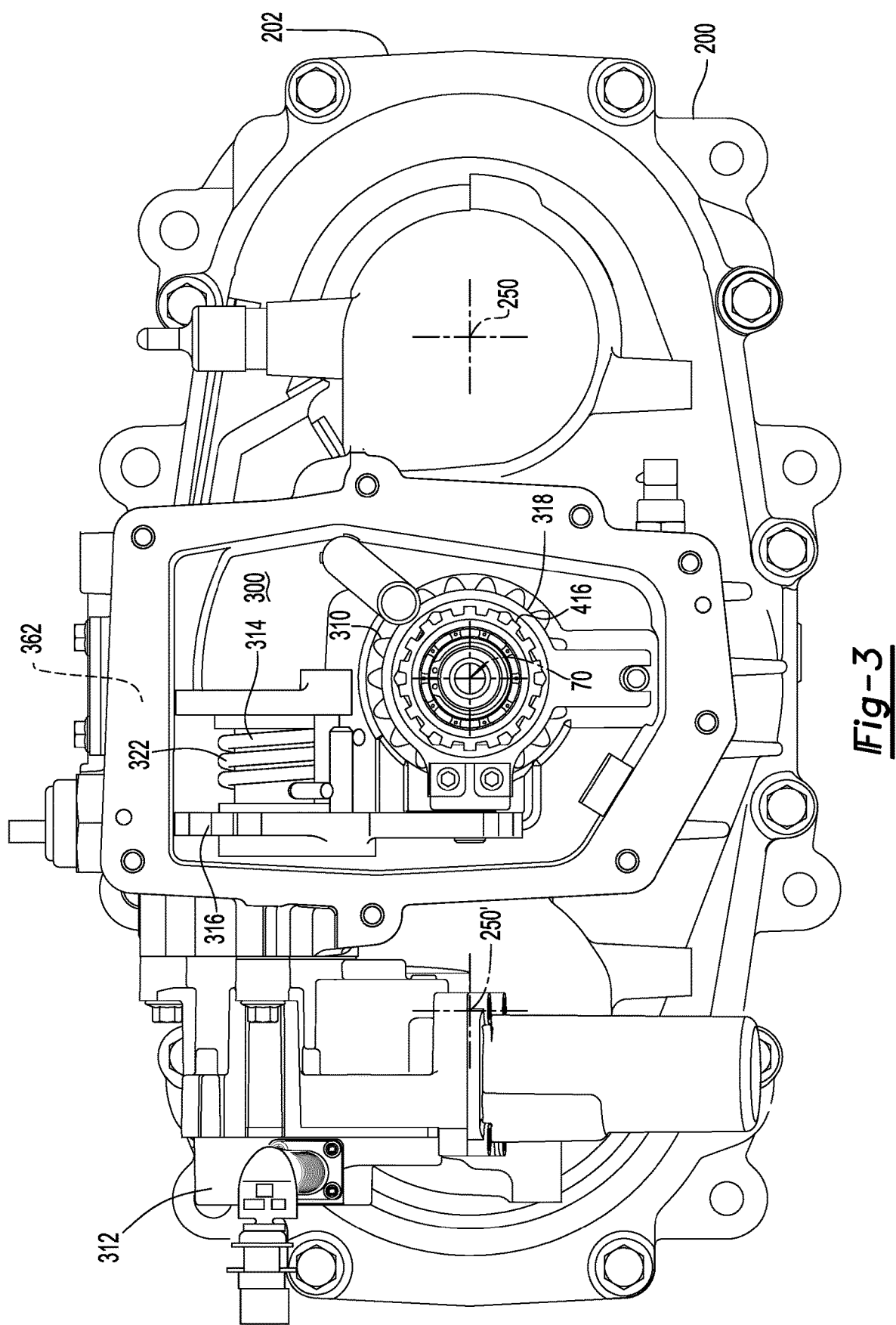
FIG. 3 is an end view of the axle assembly with a portion of cover removed and with an electric motor module and axle housing of the axle assembly omitted for clarity.

The shift mechanism 32 may be received in or partially received in a shift mechanism cavity 300, which is best shown in FIGS. 2 and 3. The shift mechanism cavity 300 may be at least partially defined by the second transmission housing 202 may be disposed proximate an end of the axle assembly 10. Referring to FIGS. 1 and 2, a cover 302 may enclose an end of the axle assembly 10 and help define the shift mechanism cavity 300. The cover 302 may be mounted on the end of the second transmission housing 202 to help enclose the shift mechanism cavity 300. The cover 302 may be a single component or may be an assembly of multiple parts. A portion of the cover 302 is removed in FIG. 3.

The shift mechanism 32 may have any suitable configuration. In at least one configuration such as is shown in FIG. 5, the shift mechanism 32 may include a shift collar 310, an actuator 312, a detent linkage 314, a linkage 316, a collar 318, and a linkage retaining device 320. The shift mechanism 32 may also include a biasing member 322, a first pin 324, and a second pin 326.

Referring primarily to FIGS. 5-7, the shift collar 310 may be rotatable about the axis 70 with the drive pinion 30. In addition, the shift collar 310 may be moveable along the axis 70 with respect to the drive pinion 30. The shift collar 310 may selectively connect a member of the set of drive pinion gears 210 to the drive pinion 30 as will be discussed in more detail below. The shift collar 310 may be at least partially received in the shift mechanism cavity 300 and may be extendable through components of the transmission 204, such as the set of drive pinion gears 210. In at least one configuration, the shift collar 310 may include a first end 330, a second end 332, a shift collar hole 334, and a shift collar spline 336. The shift collar 310 may also include a first tubular shift collar portion 340, a second tubular shift collar portion 342, a shift collar gear 344, a threaded portion 348 or combinations thereof.

Referring primarily to FIG. 6, the first end 330 may face toward the drive pinion 30. In addition, the first end 330 may be disposed adjacent to the drive pinion 30 or the drive pinion extension 90.

The second end 332 may be disposed opposite the first end 330. As such, the second end 332 may face away from the drive pinion 30.

The shift collar hole 334 may extend along the axis 70 between the first end 330 and the second end 332. In at least one configuration, the shift collar hole 334 may be configured as a through hole that may extend from the first end 330 to the second end 332. The drive pinion 30 or the drive pinion extension 90 may be received inside the shift collar hole 334.

Referring to FIGS. 5 and 7, the shift collar spline 336 may couple the shift collar 310 to the drive pinion 30 or the drive pinion extension 90. The shift collar spline 336 may be disposed in the shift collar hole 334 and may be axially positioned near the first end 330. The shift collar spline 336 may extend toward the axis 70 and may mate with a spline of the drive pinion 30 or the spline 98 of the drive pinion extension 90 that may have spline teeth that may extend away from the axis 70. The mating splines may allow the shift collar 310 to move in an axial direction or along the axis 70 while inhibiting rotation of the shift collar 310 about the axis 70 with respect to the drive pinion 30. Thus, the shift collar 310 may be rotatable about the axis 70 with the drive pinion 30 when the shift collar spline 336 mates with the spline of the drive pinion 30 or the drive pinion extension 90.

The first tubular shift collar portion 340 may extend from the first end 330 toward the second end 332. The first tubular shift collar portion 340 may have a hollow tubular configuration and may be at least partially received inside the set of drive pinion gears 210 of the transmission 204. The first tubular shift collar portion 340 may have a larger outside diameter than the second tubular shift collar portion 342.

The second tubular shift collar portion 342, if provided, may extend from the second end 332 toward the first tubular shift collar portion 340 or to the first tubular shift collar portion 340. For instance, the second tubular shift collar portion 342 may have a hollow tubular configuration and may be at least partially disposed outside of the set of drive pinion gears 210.

The shift collar gear 344 may be disposed between the first end 330 and the second end 332 of the shift collar 310. In at least one configuration, the shift collar gear 344 may be disposed opposite the shift collar hole 334 and may extend from the first tubular shift collar portion 340. The shift collar gear 344 may have teeth that may be arranged around the axis 70 and that may extend away from the axis 70 and away from the shift collar hole 334. The shift collar spline 336 may be disposed opposite the shift collar gear 344. The shift collar gear 344 is engageable with different members of the set of drive pinion gears 210 as will be discussed in more detail below.

The threaded portion 348 may be axially positioned between the first end 330 and the second end 332. For instance, the threaded portion 348 may be provided with the second tubular shift collar portion 342 and may be axially positioned between the first tubular shift collar portion 340 and the second end 332. The threaded portion 348 may be disposed on an exterior side of the second tubular shift collar portion 342 that may face away from the axis 70. It is also contemplated that the threaded portion 348 may be omitted.

Referring to FIG. 5, the actuator 312 is configured to move the shift collar 310 along the axis 70 to selectively connect a member of the set of drive pinion gears 210 to the drive pinion 30. The actuator 312 may be of any suitable type, such as an electrical, electromechanical, or mechanical actuator. In at least one configuration, the actuator 312 may be mounted to the second transmission housing 202. A portion of the actuator 312 may be rotatable about an actuator axis 350. For instance, the actuator 312 may have an actuator shaft 352 that may extend along the actuator axis 350 and may be rotatable about the actuator axis 350. The actuator shaft 352 may be operatively connected to the detent linkage 314.

Referring to FIGS. 5 and 7, the detent linkage 314 is coupled to the actuator 312. For instance, the detent linkage 314 may be fixedly coupled to the actuator shaft 352. As such, the detent linkage 314 may be rotatable about the actuator axis 350 with the actuator shaft 352. The detent linkage 314 may define a plurality of recesses 360. The recesses 360 may be configured to receive a detent feature 362. The detent feature 362 may inhibit rotation of the detent linkage 314 about the actuator axis 350 when the detent feature 362 is received in a recess 360. For example, rotation of the detent linkage 314 may be inhibited when the detent feature 362 is in a recess 360 and a sufficient actuation force is not provided by the actuator 312 to overcome the rotational resistance exerted by the detent feature 362. The detent linkage 314 may be rotatable about the actuator axis 350 with respect to the linkage 316.

The linkage 316 may operatively connect the actuator 312 to the shift collar 310. In at least one configuration, the linkage 316 may be positioned along the actuator axis 350 closer to the actuator 312 than the detent linkage 314 is positioned to the actuator 312. The linkage 316 may be rotatable about the actuator axis 350. In at least one configuration, the linkage 316 be rotatably disposed on the detent linkage 314 and may be rotatable about the actuator axis 350. The linkage 316 may normally rotate with the detent linkage 314 but may rotate with respect to the detent linkage 314 when a blocked shift condition is present.

The linkage 316 may define a plurality of gaps or recesses 370. The gaps or recesses may be defined by at least one tooth that may be provided with the linkage 316. For instance, the linkage 316 may have a set of teeth. In the configuration shown, a first tooth 372 and a second tooth 374 are shown; however, it is contemplated that a different number of teeth may be provided. The teeth may be arranged such that at least one gap or recess 370 is disposed adjacent to a tooth. For instance, a gap or recess 370 may be provided between adjacent teeth or on opposite sides of a tooth. The recesses 370 may be configured to receive an engagement feature 462 of the linkage retaining device 320 as will be discussed in more detail below.

Referring to FIGS. 5 and 6, the collar 318 may receive the shift collar 310. The collar 318 may extend at least partially around the axis 70 in the shift collar 310. For instance, the collar 318 may be configured as a ring that may extend around the axis 70. The collar 318 may be coupled to the linkage 316 as will be discussed in more detail below. In at least one configuration and as is best shown in FIG. 6, the collar 318 may include a first collar side 440, a second collar side 442, and a collar hole 444. The collar 318 may also include a collar arm 446 and a shift block 448.

The first collar side 440 may face toward the transmission module 28, the drive pinion 30, or both.

The second collar side 442 may be disposed opposite the first collar side 440. As such, the second collar side 442 may face away from the transmission module 28, the drive pinion 30, or both.

The collar hole 444 may extend between the first collar side 440 and the second collar side 442. The collar hole 444 may be a through hole that may extend through the collar 318. The shift collar 310 is received inside the collar hole 444 and may be rotatable about the axis 70 with respect to the collar 318. For instance, the second tubular shift collar portion 342 may be received inside the collar hole 444 and may extend through the collar hole 444. In at least one configuration, the collar hole 444 may receive a bearing assembly that may be positioned between the shift collar 310 and the collar 318. For example, the bearing assembly may extend from an outside circumference of the second tubular shift collar portion 342 to the inside diameter of the collar 318 that defines the collar hole 444.

Referring primarily to FIGS. 5-7, the collar arm 446 extends from the collar 318. For instance, the collar arm 446 may extend from the collar 318 in a direction that extends away from the axis 70. In the configuration shown, the collar arm 446 is shown extending at an oblique angle from the collar 318 and is angled away from the transmission 204; however, it is contemplated that the collar arm 446 may be angled toward the transmission 204 or may be disposed substantially perpendicular to the axis 70. The term "substantially perpendicular" is used herein to designate features or axes that are the same as or very close to perpendicular and includes features that are within ±3° of being perpendicular each other. The collar arm 446 may be integrally formed with the collar 318 or may be a separate component that is fastened to the collar 318. In the configuration shown, the collar arm 446 is illustrated as being integrally formed with the collar 318 and is disposed below the axis 70. The collar arm 446 is moveably disposed on an alignment rod 450. The collar arm 446 and the alignment rod 450 may cooperate to limit or inhibit rotation of the collar 318 about the axis 70.

The alignment rod 450 is disposed on the shift mechanism cavity 300. For instance, the alignment rod 450 may be received in the shift mechanism cavity 300 and may be mounted to the second transmission housing 202, the cover 302, or both. In the configuration shown, the alignment rod 450 is shown as being received in a pocket or recess in the cover 302 and in a pocket of the second transmission housing 202. The alignment rod 450 may be fixedly disposed on the cover 302 or the second transmission housing 202 or may be disposed in a manner in which movement of the alignment rod 450 is limited. For example, the alignment rod 450 may slide along the axis 70 and/or rotate about the axis 70 but may remain its axial orientation. The alignment rod 450 may be disposed substantially parallel to the axis 70. In at least one configuration, the alignment rod 450 may be disposed below the axis 70, below the shift collar 310, or both. In at least one configuration, the collar arm 446 has an opening in which the alignment rod 450 may be received. The opening may be a hole, recess, slot or the like inside which the alignment rod 450 may be received. It is also contemplated that the alignment rod 450 may define a recess or slot that extends along its axial length and a portion of the alignment rod 450, such as the end of the alignment rod 450, may be received in the recess or slot in the alignment rod 450.

Referring to FIG. 6, the shift block 448, if provided, may be fixedly positioned with respect to the collar 318. The shift block 448 may be integrally formed with the collar 318 or may be provided as a separate component that is attached to the collar 318. For instance, the shift block 448 may extend from an outside circumference of the collar 318, the second collar side 442, or combinations thereof. The shift block 448, if provided, may facilitate mounting of a fastener 452 that may connect or couple the linkage 316 to the collar 318.

The first thrust bearing 410 may facilitate rotation of the shift collar 310 about the axis 70 with respect to the collar 318. The first thrust bearing 410 may be axially positioned between the first collar side 440 and the shift collar 310. Optionally, washers may be axially positioned adjacent to one or both sides of the first thrust bearing 410.

The second thrust bearing 412 may facilitate rotation of the shift collar 310 about the axis 70 with respect to the collar 318. The second thrust bearing 412 may be positioned between the second collar side 442 and the retainer nut 414. Optionally a washer may be axially positioned adjacent to one or both sides of the second thrust bearing 412. For example, a washer may be provided between the second thrust bearing 412 and the retainer nut 414.

The retainer nut 414 may be mounted to the shift collar 310. For instance, the retainer nut 414 may have a threaded hole that may receive the second tubular shift collar portion 342 and mate with the threaded portion 348 of the shift collar 310. The retainer nut 414 may inhibit axial movement of the shift collar 310 with respect to the collar 318 and may help secure the first thrust bearing 410 and the second thrust bearing 412. It is also contemplated that the retainer nut 414 may be omitted and a different fastener or fastening technique may be used. For instance, a fastener like a snap ring or a press-fit fastener may replace a threaded connection.

An encoder disc 416 may optionally be mounted to the drive pinion 30 or the drive pinion extension 90. In at least one configuration, the encoder disc 416 may be disposed adjacent to the retainer nut 414. For instance, the encoder disc 416 may be axially positioned between the retainer nut 414 and a support bearing 418 that rotatably supports the drive pinion 30 or drive pinion extension 90. For example, the support bearing 418 may be positioned between a shoulder of the drive pinion 30 or drive pinion extension 90 and the support bearing 418, if provided. The encoder disc 416 may have detectable features such as protrusions and/or recesses that may be detectable by a sensor to detect rotation or the rotational speed of the drive pinion 30.

The support bearing 418 may rotatably support the drive pinion 30 or drive pinion extension 90. For instance, the drive pinion 30 or drive pinion extension 90 may be received inside and may be rotatably supported by the support bearing 418, which in turn may be supported by the second transmission housing 202, the cover 302, or both.

The linkage retaining device 320 is selectively engageable with the linkage 316 to limit or inhibit rotation of the linkage 316 in at least one direction about the actuator axis 350. The linkage retaining device 320 may have any suitable configuration. For instance, the linkage retaining device 320 may be configured as a solenoid or linear actuator that has a shaft that is movable along a linkage retaining device axis 460. In at least one configuration, the linkage retaining device axis 460 may be disposed substantially parallel to the axis 70; however, it is contemplated that other orientations may be provided. The linkage retaining device axis 460 may be offset from the axis 70. It is also contemplated that the linkage retaining device axis 460 may be disposed substantially perpendicular to the actuator axis 350.

Referring primarily to FIG. 7, the linkage retaining device 320 may be mounted to a portion of the housing, such as the cover 302. The linkage retaining device 320 may include an engagement feature 462. The engagement feature 462 may be movable along the linkage retaining device axis 460. For instance, the engagement feature 462 may be disposed at an end of the shaft of the linkage retaining device 320. The engagement feature 462 may be engageable with at least one member of the set of teeth of the linkage 316 to limit or inhibit rotation of the linkage 316 about the actuator axis 350. The detent linkage 314 may be rotatable about the actuator axis 350 with respect to the linkage 316 when the engagement feature 462 is engaged with at least one member of the set of teeth. The linkage retaining device 320 is operable independent from the detent feature 362.

Referring to FIG. 5, the biasing member 322 may operatively connect the detent linkage 314 to the linkage 316. In addition, the biasing member 322 may control relative rotational movement between the detent linkage 314 and the linkage 316 (e.g., rotational movement of the linkage 316 with respect to the detent linkage 314). For example, the biasing member 322 may permit the actuator shaft 352 and the detent linkage 314 to rotate about the actuator axis 350 with respect to the linkage 316 when the shift collar 310 is inhibited from moving along the axis 70, such as during a blocked shift as will be discussed in more detail below. The biasing member 322 may be positioned along the actuator axis 350 between the detent linkage 314 and the linkage 316. The biasing member 322 may have any suitable configuration. For instance, the biasing member 322 may be configured as a spring, such as a torsion spring.

The first pin 324 may extend from the detent linkage 314 toward the linkage 316. The first pin 324 may be spaced apart from the linkage 316. The first pin 324 may engage an end or tab of the biasing member 322.

The second pin 326 may extend from the linkage 316. The second pin 326 may be spaced apart from the first pin 324 and the detent linkage 314. The second pin 326 may engage the same end or tab and/or a different end or tab of the biasing member 322.

Various components of the shift mechanism 32 may typically move together when the shift collar 310 is free to move along the axis 70. For instance, components such as the actuator shaft 352, detent linkage 314, linkage 316, and the biasing member 322 may rotate together about the actuator axis 350 when the actuator shaft 352 is rotated and the shift collar 310 is free to move along the axis 70. However, some of these components may move respect to each other when the shift collar 310 is not free to move along the axis 70. For example, the actuator shaft 352 and the detent linkage 314 may be rotatable with respect to the linkage 316 when the shift collar 310 is not free to move along the axis 70. The shift collar 310 may not be free to move along the axis 70 when the rotational speed of the shift collar 310 about the axis 70 is not sufficiently synchronized with the rotational speed of a member of the set of drive pinion gears 210. For instance, the shift collar 310 may be blocked from shifting or moving along the axis 70 when the teeth of the shift collar gear 344 are inhibited from entering the gaps between the inner gear teeth of a drive pinion gear or exiting the gaps between the inner gear teeth of a drive pinion gear.

Relative rotational movement of the detent linkage 314 with respect to the linkage 316 is accommodated by the biasing member 322 when there is a blocked shift. For instance, the first pin 324 may remain in engagement with the second end or second tab of the biasing member 322 but may be rotated to disengage or move away from the first end or first tab of the biasing member 322. The second pin 326 may remain in engagement with the first end but may be disengaged from the second end. This relative rotational movement may store potential energy in the biasing member 322. The potential energy may be released when the blocked shift condition is no longer present, such as when the rotational speed of the shift collar 310 is sufficiently synchronized with the rotational speed of a member of the set of drive pinion gears 210 to permit axial movement of the shift collar 310. As a result, the actuator 312 may complete its intended rotation of the actuator shaft 352 as if the shift collar 310 not blocked even when a blocked shift condition is present, thereby avoiding heating/overheating of the actuator 312 and the consumption of energy that would occur if the actuator 312 had to continuously work or exert force to attempt to complete shifting of the shift collar 310. Moreover, sufficient potential energy may be stored in the biasing member 322 that may be released to complete a shift of the shift collar 310 when sufficient synchronization is obtained.

Operation of the Shift Mechanism

Figure 8:
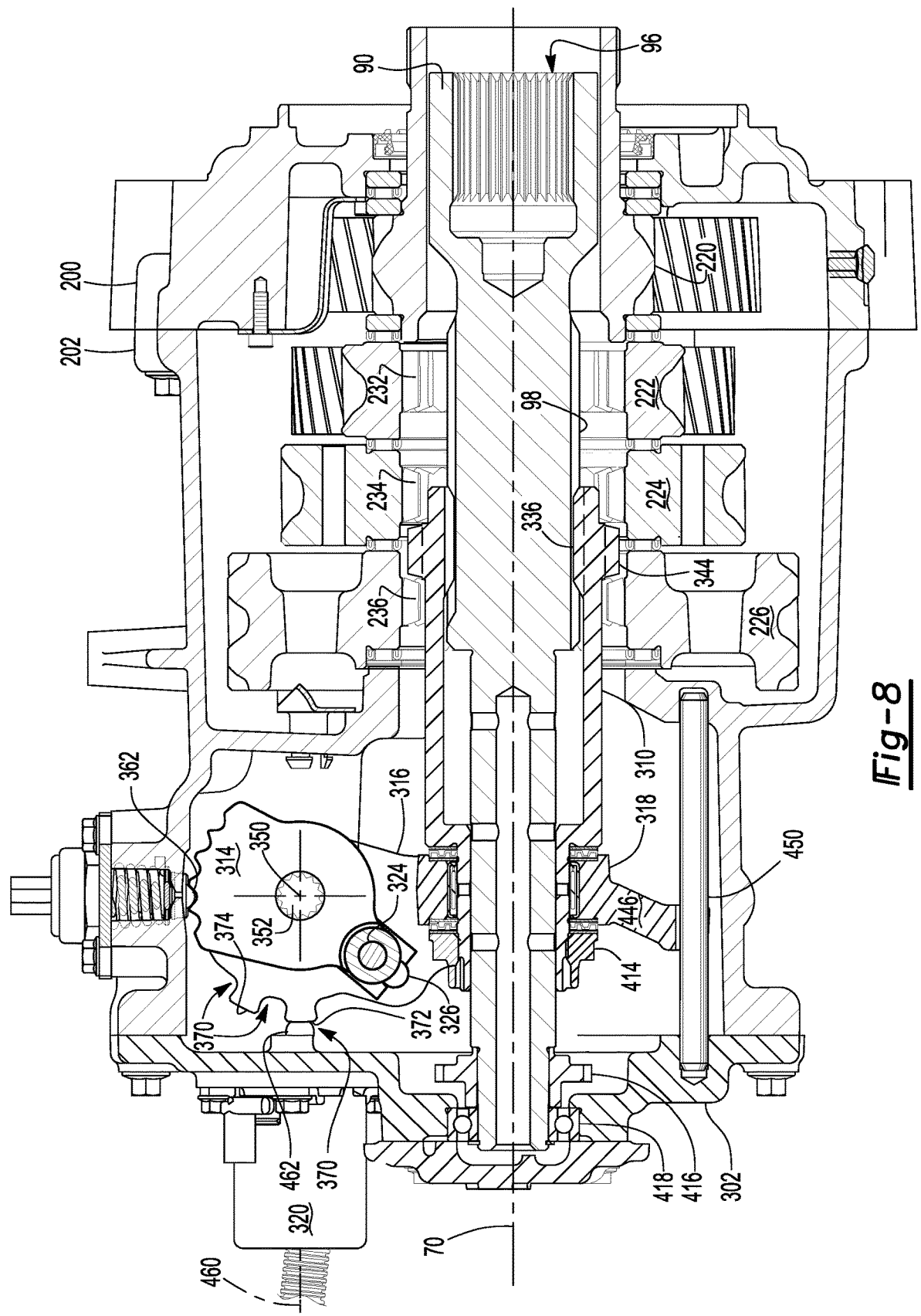
FIG. 8 is a section view of a portion of the axle assembly in FIG. 7 with the shift collar in a first neutral position.
Figure 9:
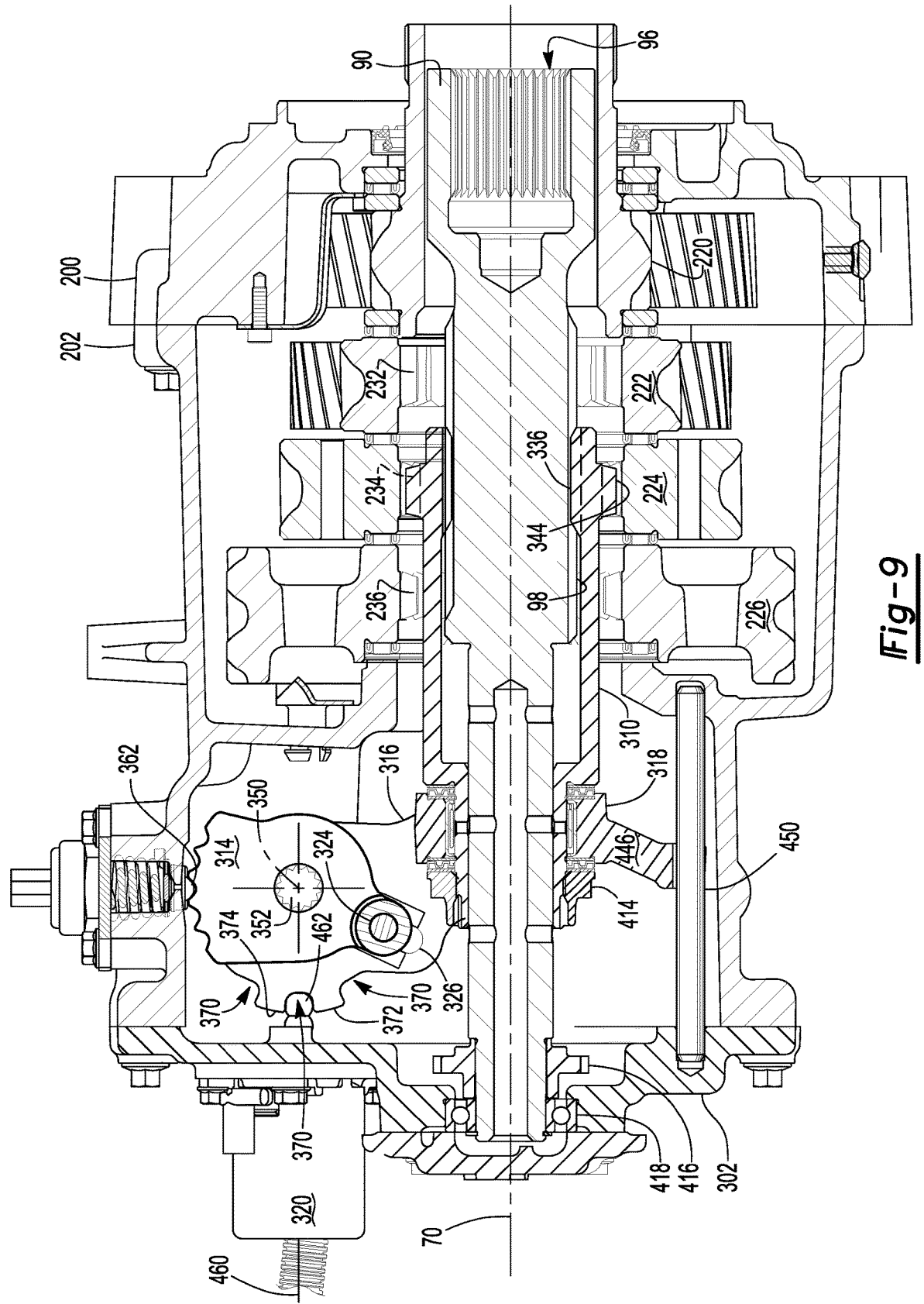
FIG. 9 is a section view of a portion of the axle assembly in FIG. 7 with the shift collar in a second position.
Figure 10:
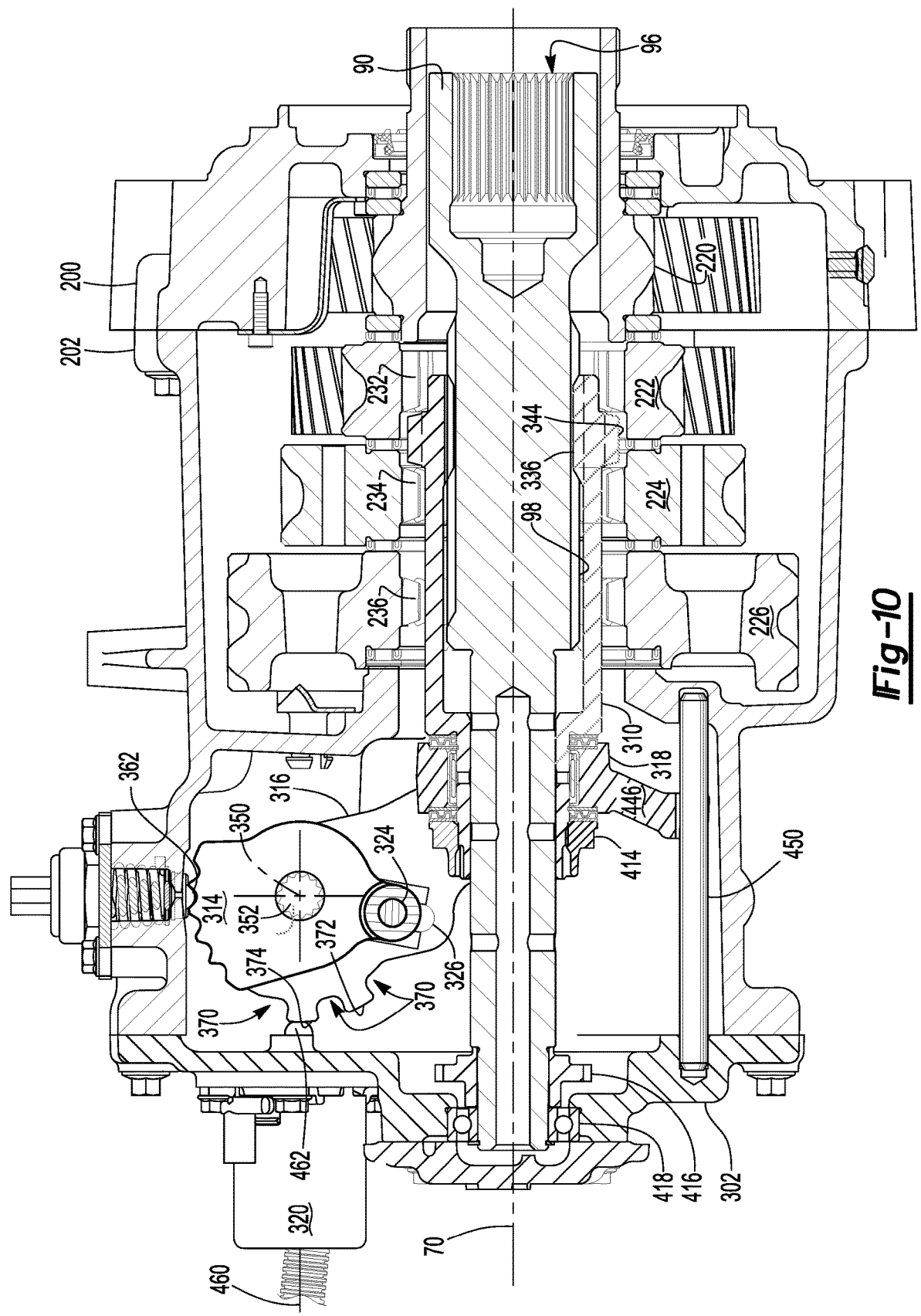
FIG. 10 is a section view of a portion of the axle assembly in FIG. 7 with the shift collar in a second neutral position.
Figure 11:
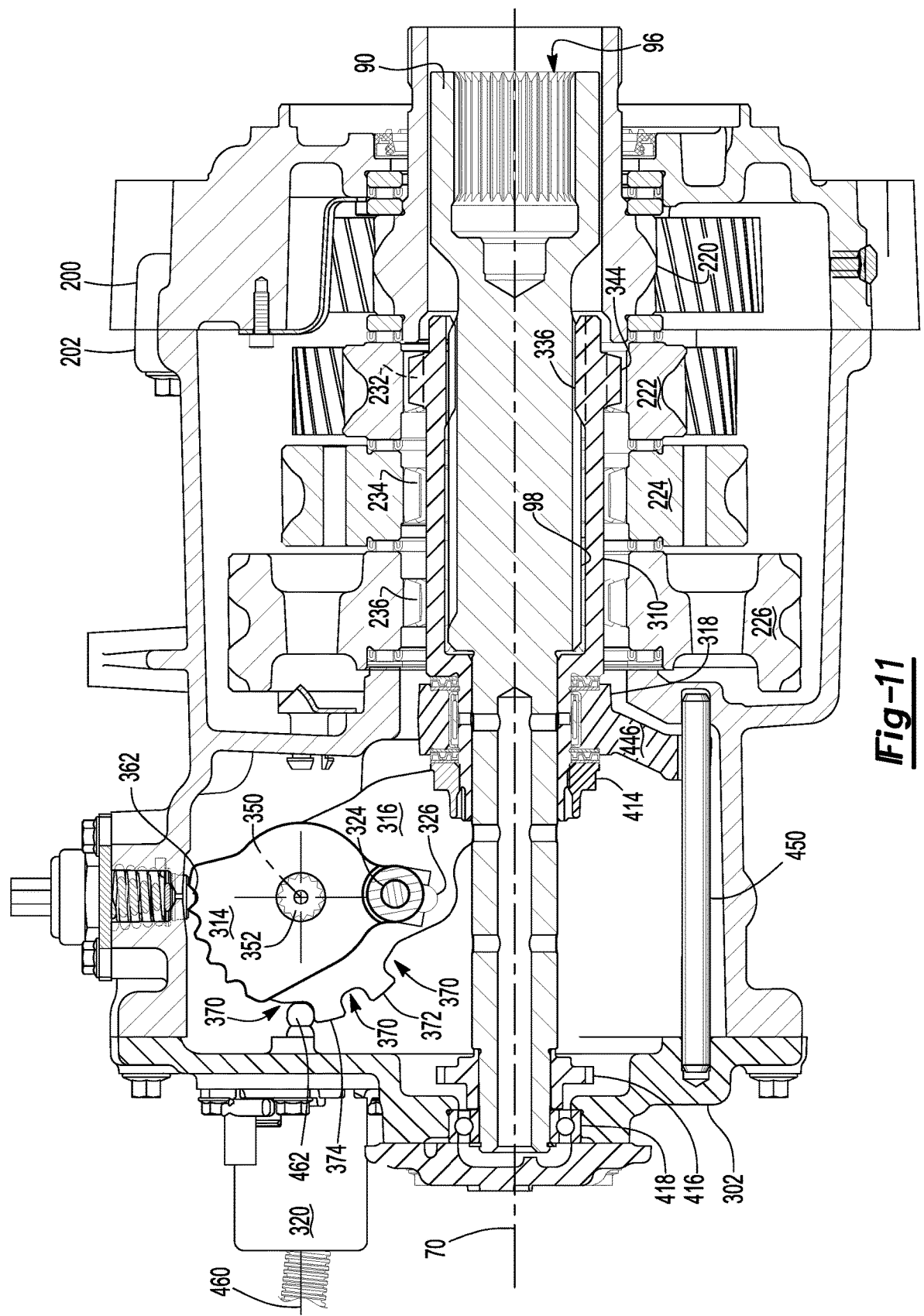
FIG. 11 is a section view of a portion of the axle assembly in FIG. 7 with the shift collar in a third position.

Referring to FIGS. 7-11, the actuator 312 may move the shift collar 310 along the axis 70 between a plurality of positions to selectively couple the shift collar 310 to the transmission 204 or to decouple the shift collar 310 from the transmission 204. For instance, the actuator 312 may move the shift collar 310 along the axis 70 between the first, second, and third positions. Examples of these positions are illustrated in FIGS. 7, 9, and 11. The actuator 312 may also move the shift collar 310 along the axis 70 to first and second neutral positions, which are best shown in FIGS. 8 and 10. It is noted that in FIGS. 7-11 only a portion of the transmission 204 is shown to better illustrate movement of the shift collar 310. In the examples below, reference to connecting or disconnecting a member of the set of drive pinion gears 210 to/from the drive pinion 30 includes direct and indirect connections to and disconnections from the drive pinion 30. For instance, a member of the set of drive pinion gears 210 may be directly coupled to the drive pinion 30 or indirectly connected to the drive pinion 30 such as via the drive pinion extension 90.

Referring to FIG. 7, the shift collar 310 is shown in the first position. In the first position, the shift collar 310 may couple the fourth gear 226 to the drive pinion 30. For example, the teeth of the shift collar gear 344 may mesh with the inner gear teeth 236 of the fourth gear 226. Torque may be transmitted from the rotor 106 to the first gear 220 such as via the rotor output flange 130, from the first gear 220 to the first countershaft gears 270, 270', from the first countershaft gears 270, 270' to the fourth countershaft gears 276, 276' via the first and second countershafts 260, 260', respectively, from the fourth countershaft gears 276, 276' to the fourth gear 226, and from the fourth gear 226 to the drive pinion 30 via the shift collar gear 344 of the shift collar 310. The first gear 220, the second gear 222, and the third gear 224 may be rotatable about the axis 70. Torque may be provided at the first gear ratio in the first position, such as a low-speed gear ratio.

The engagement feature 462 may be disposed in a recess 370 and may engage the first member 372 of the set of teeth of the linkage 316 but not the second tooth 374 to inhibit movement of the shift collar 310 in a first direction along the axis 70 when the shift collar 310 is in the first position and the linkage 316 is in a first rotational position as shown. The first direction along the axis 70 may be to the right from the perspective shown. It is also contemplated that an additional tooth could be provided on the linkage 316 to inhibit movement of the shift collar 310 in the second direction along the axis 70.

Referring to FIG. 8, the shift collar 310 is shown in the first neutral position. In the first neutral position, the shift collar 310 may not couple any member of the set of drive pinion gears 210 to the drive pinion 30. As such, the teeth of the shift collar gear 344 may be spaced apart from the first gear 220, the second gear 222, the third gear 224, and the fourth gear 226. The teeth of the shift collar gear 344 may be axially positioned between the inner gear teeth 234 of the third gear 224 and the inner gear teeth 236 of the fourth gear 226. As such, the first gear 220, the second gear 222, the third gear 224, and the fourth gear 226 may be rotatable about the axis 70 with respect to the drive pinion 30 when the shift collar 310 is in the first neutral position and torque may not be transmitted between the transmission 204 and the drive pinion 30. The first neutral position may be positioned between the first position shown in FIG. 7 and the second position shown in FIG. 9.

The engagement feature 462 may be retracted out of a recess 370 in the linkage 316 when the shift collar 310 is in the first neutral position. For example, the engagement feature 462 may be aligned with the first tooth 372 or first member of the set of teeth of the linkage 316 when the shift collar 310 is in the first neutral position. The engagement feature 462 may be spaced apart from the first tooth 372 or may contact a side of the first tooth 372 that faces away from the actuator axis 350 in this position.

Referring to FIG. 9, the shift collar 310 is shown in the second position. In the second position, the shift collar 310 may couple the third gear 224 to the drive pinion 30. For example, the teeth of the shift collar gear 344 may mesh with the inner gear teeth 234 of the third gear 224. Torque may be transmitted from the rotor 106 to the first gear 220 such as via the rotor output flange 130, from the first gear 220 to the first countershaft gears 270, 270', from the first countershaft gears 270, 270' to the third countershaft gears 274, 274' via the first and second countershafts 260, 260', respectively, from the third countershaft gears 274, 274' to the third gear 224, and from the third gear 224 to the drive pinion 30 via the shift collar gear 344 of the shift collar 310. As such, the first gear 220, the second gear 222, and the fourth gear 226 may be rotatable about the axis 70 with respect to the drive pinion 30 when the second gear ratio is provided. Torque may be provided at the second gear ratio in the second position, such as a mid-speed gear ratio.

The engagement feature 462 may be engageable with one or more teeth of the linkage 316 when the shift collar 310 is in the second position. For instance, the engagement feature 462 may engage the second tooth 374 or a second member of the set of teeth of the linkage 316 to inhibit movement of the shift collar 310 in the first direction along the axis 70 when the shift collar 310 is in the second position and the linkage 316 is in a second rotational position as shown. The engagement feature 462 may engage the first tooth 372 to inhibit movement of the shift collar 310 in a second direction along the axis 70 when the shift collar 310 is in the second position and the linkage 316 is in a second rotational position as shown. The second direction along the axis 70 may be disposed opposite the first direction, such as to the left from the perspective shown.

Referring to FIG. 10, the shift collar 310 is shown in the second neutral position. In the second neutral position, the shift collar 310 may not couple any member of the set of drive pinion gears 210 to the drive pinion 30. As such, the teeth of the shift collar gear 344 may be spaced apart from the first gear 220, the second gear 222, the third gear 224, and the fourth gear 226. The teeth of the shift collar gear 344 may be axially positioned between the inner gear teeth 234 of the third gear 224 and the inner gear teeth 232 of the second gear 222. As such, the first gear 220, the second gear 222, the third gear 224, and the fourth gear 226 may be rotatable about the axis 70 with respect to the drive pinion 30 when the shift collar 310 is in the second neutral position and torque may not be transmitted between the transmission 204 and the drive pinion 30. The second neutral position may be positioned between the second position shown in FIG. 9 and the third position shown in FIG. 11.

The engagement feature 462 may be retracted out of a recess 370 in the linkage 316 when the shift collar 310 is in the second neutral position. For example, the engagement feature 462 may be aligned with the second tooth 374 of the linkage 316 when the shift collar 310 is in the second neutral position. The engagement feature 462 may be spaced apart from the second tooth 374 or may contact a side of the second tooth 374 that faces away from the actuator axis 350 in this position.

Referring to FIG. 11, the shift collar 310 is shown in the third position. In the third position, the shift collar 310 may couple the second gear 222 to the drive pinion 30. For example, the teeth of the shift collar gear 344 may mesh with the inner gear teeth 232 of the second gear 222. Torque may be transmitted from the rotor 106 to the first gear 220 such as via the rotor output flange 130, from the first gear 220 to the first countershaft gears 270, 270', from the first countershaft gears 270, 270' to the second countershaft gears 272, 272' via the first and second countershafts 260, 260', respectively, from the second countershaft gears 272, 272' to the second gear 222, and from the second gear 222 to the drive pinion 30 via the shift collar gear 344 of the shift collar 310. The shift collar gear 344 may not engage the inner gear teeth 234 of the third gear 224 or the inner gear teeth 236 of the fourth gear 226. As such, the first gear 220, the third gear 224, and the fourth gear 226 may be rotatable about the axis 70 with respect to the drive pinion 30 when the third gear ratio is provided. Torque may be provided at the third gear ratio in the third position, such as a high-speed gear ratio.

The engagement feature 462 may engage the second tooth 374 of the linkage 316 to inhibit movement of the shift collar 310 in the second direction along the axis 70, or to the left from the perspective shown, when the shift collar 310 is in the third position and the linkage 316 is in a third rotational position as shown. It is also contemplated that an additional tooth could be provided on the linkage 316 to inhibit movement of the shift collar 310 in the first direction along the axis 70.

The present invention may provide an alignment shaft that limits or inhibits rotation of the collar about an axis. Such a configuration may help reduce load forces or torsional stress on components of a shift mechanism. In addition, such a configuration may help the collar aligned and in engagement with the linkage throughout the operating range or travel distance of components of the shift mechanism, thereby providing a more robust connection and reliable operation.

The present invention may provide a linkage retaining device in addition to a detent mechanism to help reduce or prevent load forces from being transmitted to the actuator, such as when the shift collar is "kicked out" or experiences load forces in an axial direction or along the axis associated with meshing gear teeth rather than operation of the actuator. For example, teeth of the shift collar may mesh with teeth of a member of the set of drive pinion gears. The shape or curvature of the teeth, such as when a concave flank of one tooth meshes with a convex flank of another tooth, can result in an axial force vector that urges the shift collar teeth to self-center with respect to the drive pinion gear. Thus the axial force may urge the shift collar to move along the axis to a more centered position when there is some degree of misalignment. In the absence of the linkage retaining device, axial forces on the shift collar or axial movement of the shift collar may transmit load forces upstream toward the actuator, which may lead to increased stress on the actuator or other components and unintended rotation of the actuator shaft. The linkage retaining device absorbs or resists such load forces from being transmitted upstream past the linkage which may help improve durability of components such as the actuator. The linkage retaining device may act as a stop that prevents movement of the shift collar in at least one axial direction when the shift collar is in meshing engagement with the teeth of a member of the set of drive pinions, thereby permitting sufficient tooth meshing to provide reliable torque transmission while reducing or avoiding undesired axial movement of the shift collar and upstream force transmission in the shift mechanism past the linkage retaining device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a drive pinion that is rotatable about an axis;
   a set of drive pinion gears that is received in a housing, wherein the set of drive pinion gears is spaced apart from the drive pinion and is rotatable about the axis;
   an alignment rod that is disposed on the housing;
   a shift collar that is rotatable about the axis with the drive pinion and moveable along the axis with respect to the drive pinion; and
   a collar that defines a collar hole that receives the shift collar, the collar having a collar arm that is moveably disposed on the alignment rod, wherein the alignment rod inhibits rotation of the collar about the axis.

2. The axle assembly of claim 1 wherein the alignment rod is disposed substantially parallel to the axis.

3. The axle assembly of claim 1 wherein the alignment rod is disposed below the axis and the shift collar.

4. The axle assembly of claim 1 wherein the collar arm has an opening in which the alignment rod is received.

5. The axle assembly of claim 1 wherein the housing includes a first transmission housing and a second transmission housing that cooperate to define a transmission cavity that receives a transmission, wherein a cover is disposed on the second transmission housing, the second transmission housing and the cover cooperate to at least partially define a shift mechanism cavity, and the alignment rod is received in the shift mechanism cavity.

6. The axle assembly of claim 5 wherein the alignment rod is mounted to the second transmission housing.

7. The axle assembly of claim 6 wherein the alignment rod is mounted to the cover.

8. An axle assembly comprising:
   a drive pinion that is rotatable about an axis;
   a transmission that includes a set of drive pinion gears that is spaced apart from the drive pinion and is rotatable about the axis; and
   a shift mechanism that includes:
      a shift collar that is rotatable about the axis with the drive pinion and moveable along the axis with respect to the drive pinion;
      an actuator that is configured to move the shift collar along the axis to selectively connect a member of the set of drive pinion gears to the drive pinion;
      a detent linkage that is coupled to the actuator and is rotatable about an actuator axis;
      a linkage that is rotatably disposed on the detent linkage and is rotatable about the actuator axis;
      a collar that is coupled to the linkage and that defines a collar hole that receives the shift collar; and
      a linkage retaining device that is selectively engageable with the linkage to inhibit rotation of the linkage in at least one direction about the actuator axis.

9. The axle assembly of claim 8 wherein the linkage retaining device has an engagement feature that is moveable along a linkage retaining device axis, wherein the linkage retaining device axis is disposed substantially parallel to the axis.

10. The axle assembly of claim 9 wherein the linkage retaining device axis is offset from the axis.

11. The axle assembly of claim 8 wherein the linkage retaining device has an engagement feature that is moveable along a linkage retaining device axis, wherein the linkage retaining device axis is disposed substantially perpendicular to the actuator axis.

12. The axle assembly of claim 8 wherein the linkage retaining device has an engagement feature that is moveable along a linkage retaining device axis, the linkage has a set of teeth, and the engagement feature is engageable with at least one member of the set of teeth to inhibit rotation of the linkage about the actuator axis.

13. The axle assembly of claim 12 wherein the detent linkage is rotatable about the actuator axis with respect to the linkage when the engagement feature is engaged with at least one member of the set of teeth.

14. The axle assembly of claim 12 wherein the engagement feature engages a first member of the set of teeth when the linkage is in a first position and inhibits movement of the shift collar in a first direction along the axis.

15. The axle assembly of claim 14 wherein the engagement feature engages a second member of the set of teeth when the linkage is in a third position and inhibits movement of the shift collar in a second direction along the axis, the second direction being disposed opposite the first direction.

16. The axle assembly of claim 12 wherein the engagement feature is positioned between a first member of the set of teeth and a second member of the set of teeth when the linkage is in a second position, wherein the engagement feature engages the first member of the set of teeth to inhibit movement of the shift collar in a second direction along the axis and engages the second member of the set of teeth to inhibit movement of the shift collar in a first direction along the axis.

17. The axle assembly of claim 16 wherein the first member of the set of teeth is aligned with the engagement feature when the shift collar is in a first neutral position.

18. The axle assembly of claim 16 wherein the second member of the set of teeth is aligned with the engagement feature when the shift collar is in a second neutral position.

19. The axle assembly of claim 8 wherein the detent linkage has a set of recesses and a detent feature is receivable in a member of the set of recesses to resist rotation of the detent linkage, wherein the detent linkage is operable independent from the linkage retaining device.

20. The axle assembly of claim 8 wherein the collar has a collar arm that is moveably disposed on an alignment rod that extends substantially parallel to the axis, wherein the alignment rod inhibits rotation of the collar about the axis.

* * * * *